United States Patent [19]
Pacault et al.

[11] Patent Number: 4,878,634
[45] Date of Patent: Nov. 7, 1989

[54] DEVICE FOR RECEIVING AND SECURING LOADS OR VEHICLE HOOKING SYSTEMS

[76] Inventors: Michel E. Pacault, 13, rue Bernard Roy, 44100 Nantes; Jean-Jacques E. Gallet, 37, rue Camille Passarro, 44000 Reze, both of France

[21] Appl. No.: 117,961

[22] Filed: Nov. 9, 1987

[30] Foreign Application Priority Data

Nov. 19, 1986 [FR] France .................................. 86 16065

[51] Int. Cl.$^4$ ............................................... B64F 1/12
[52] U.S. Cl. ..................................... 244/115; 114/261
[58] Field of Search ........................... 244/114 R, 115; 114/261; 52/581, 180, 387, 578, 171; 410/91, 68, 92; 108/55.1, 55.3, 55.5, 51.1, 901

[56] References Cited

U.S. PATENT DOCUMENTS 3,877,664  4/1975  Mesvet et al. ....................... 244/115
4,420,131  12/1983  Middletor ............................ 244/115

FOREIGN PATENT DOCUMENTS 117751  6/1968  United Kingdom .

Primary Examiner—Galen L. Barefoot
Attorney, Agent, or Firm—Oliff & Berridge

[57] ABSTRACT

The invention concerns reception and securing device for a hooking system used for mooring loads or vehicles onto a platform 1, of the type including one upper perforated plate 3, and support means 7 for said plate, connected together by pillars 8.

The said support means are made up of one lower plate 7 of approximately constant thickness in contact with said platform 1, in combination with said pillars 8 which comprise two shoulders 15 and 16 respectively in contact with said upper and lower plates, to make a strong unit and to provide a constant separation between said upper perforated plate and said lower plate. The thickness of said lower plate 7 is thin comparatively to the thickness of said upper plate, for example lower than or equal to 1 cm. The device comprises means for securing said upper place to said platform, said means being one spacer 8 which consists of a set of legs welded to said platform, said upper plate 3 being attached to each leg by a screw. The spacer 6 consists of a set of bases 10 fastened to said platform, one female stud being secured in an opening in each base.

The device is used for mooring heavy helocopters on the deck of a ship.

15 Claims, 3 Drawing Sheets

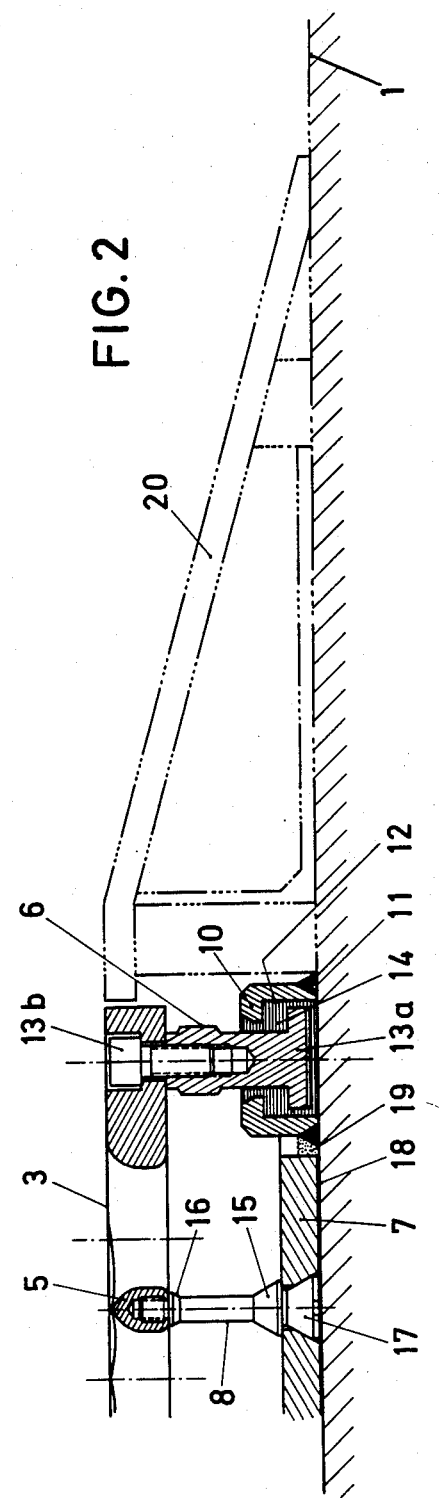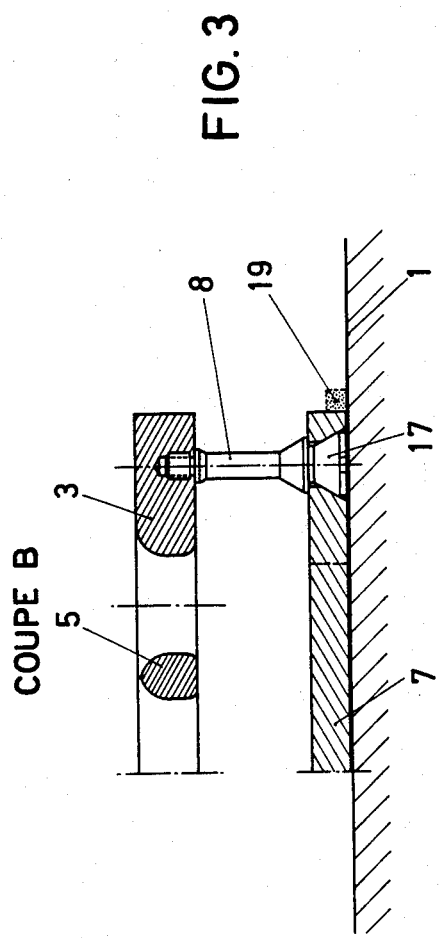

DEVICE FOR RECEIVING AND SECURING LOADS OR VEHICLE HOOKING SYSTEMS

FIELD OF THE INVENTION

The technical field of the present invention is the one of reception and fastening devices for hooking systems used in mooring loads or vehicles on an oscillating platform.

BACKGROUND OF THE INVENTION

In U.S. Pat. No. 3,877,664, a device of this type is described including an upper perforated plate and a resisting framework comprising pillars and T-shaped sections for supporting this plate. This structure is integrated into the platform in such a way as to provide continuity between the two surfaces. The perforated plate rests on an annular support flange and the assembly perforated plate/pillars/sections constitutes an elastically deformable hanged structure, capable to absorb loads equivalent to the maximum loads to which the platform itself may be subjected. The pillars and the T-shaped sections are designed to ensure only a bending-strength generated by the load by a distribution of the strengths on the total assembly. However, this device exhibits two disadvantages.

Firstly, it means cutting a hole in the platform, and it can be seen that when the platform is the deck of a ship, this factor must be taken into account from the very design stage of the ship. Moreover, this cutout will inevitably affect the strength of the deck.

Secondly, it has been found that for engines weighing more than thirteen tons, it is not possible to use this device as such, even if it is attached directly to the platform, because this hanged assembly is not built to offer resistance against crushing stresses on the platform.

Pat. No. GB-A-1 117 751, describes a device for receiving and fastening a helicopter on the deck of a ship; but it is a system of bars, the ends of which are bolted on a roughly vertical support. This system cannot be used with heavy vehicles with weights of the order of thirteen tons, and has not been manufactured industrially.

SUMMARY OF THE INVENTION

The purpose of the present invention is to provide a reception device, able to withstand against crushing stresses created by heavy helicopters which can be mounted on a platform without affecting the strength of the platform, and which does not too much rise over the level of the platform.

The invention is thus a reception and securing device for a hooking system used for mooring loads or vehicles on a platform, of the type including one upper perforated plate and support means for said plate, connected together by pillars, wherein said support means is made up of one lower plate of approximately constant thickness in contact with said platform, in combination with said pillars which comprise two shoulders respectively in contact with said upper and lower plates, to make a strong unit and to provide a constant separation between said upper perforated plate and said lower plate.

The thickness of said lower plate may be thin comparatively to the thickness of said upper plate, for example lower than or equal to 1 cm.

The device may comprise means for securing said upper plate to said platform, said means being one spacer.

The spacer may consist of a set of legs welded to said platform, said upper plate being connected to each leg by a screw.

The spacer may consist of a set of bases fastened to said platform, one female stud being secured in an opening in each base.

The perforated plate may be connected to each female stud by one screw fitted longitudinally into said stud.

Each female stud may be sealed in each said bases by a packing of synthetic resin.

Each base may be welded to said platform.

Each base may be fitted into a groove of said lower plate.

A film of synthetic resin may be laid between said lower plate and said platform on one side, and between said lower plate and said spacer on the other side.

One advantage of the present invention is that the device according to the invention may be installed on any relatively flat surface.

Another advantage is that full use is made of the platform stiffness to add to the absorption of the compressive and tensile forces applied by the load being received.

Another advantage resides in the small thickness of the device over the platform surface.

Another advantage of the invention resides in the fact that the support means also acts to reinforce the structure by improving its compressive strength, and especially its tensile strength.

Other features and advantages of the invention will be better understood with the further description given below, of a preferred embodiment.

BRIEF DESCRIPTION OF THE DRAWINGS

FIG. 2 is a section (A—A) of FIG. 1, FIG. 3 is a section (B—B) of FIG. 1, and FIGS. 4 and 5 show variants of spacer construction.

DESCRIPTION OF THE PREFERRED EMBODIMENT

Figure 1:
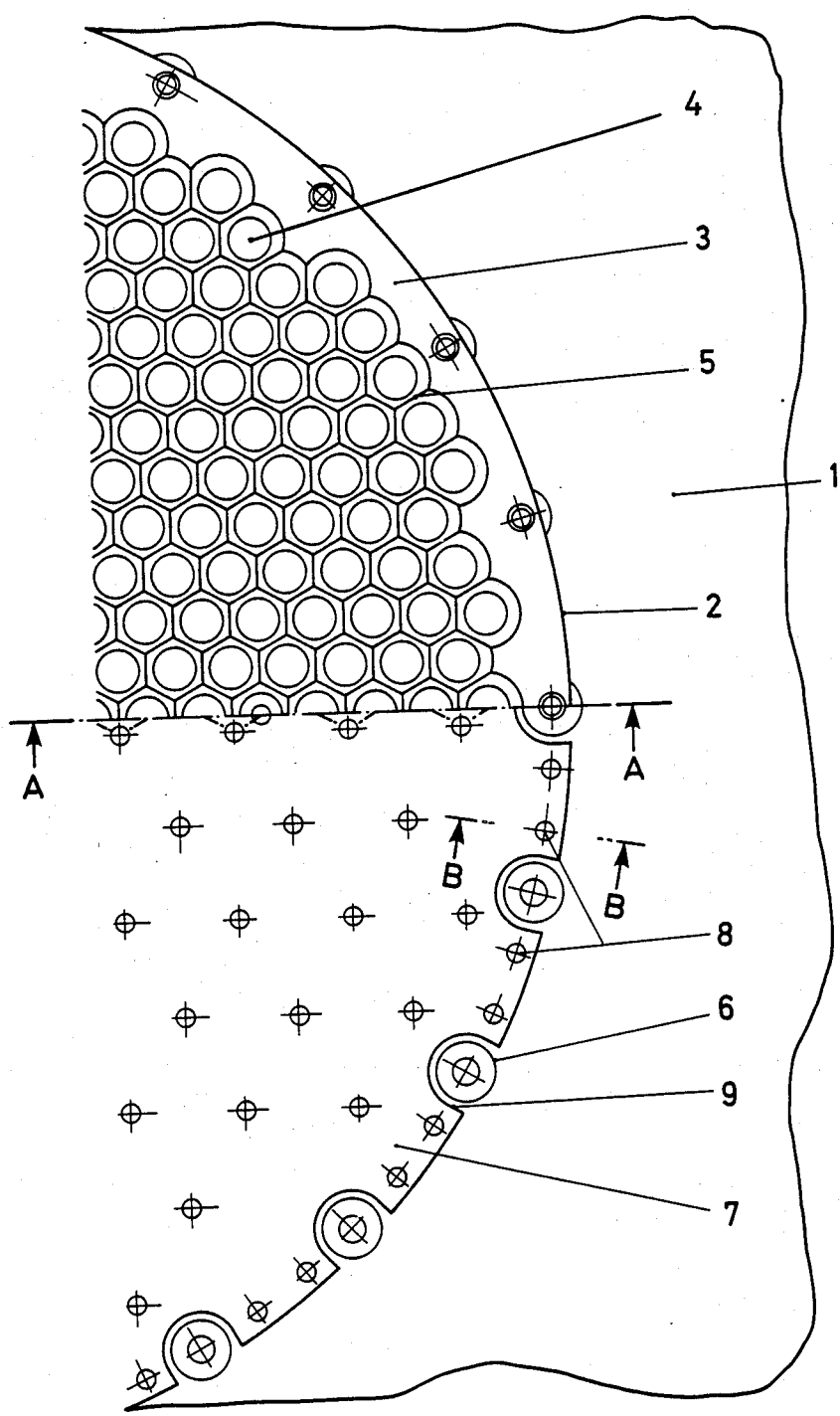
FIG. 1 is a partial elevation view showing the perforated plate and the lower plate.

FIG. 1 shows a platform 1, which may be for example the deck of a ship, on which is fastened the device 2 according to the invention, for receiving and securing loads or vehicles like helicopters. The device 2 includes one upper perforated plate 3, the structure of which has been described in the U.S. Patent mentioned above, pillers 8 and a lower plate 7. The upper plate comprises a series of holes 4, whose central points are located at the apexes of equilateral triangles. The metal remaining between two consecutive holes delimits a bar 5 of material on which the hooking device of an helicopter is secured in a known manner. The arrangement of the holes provide a honeycomb structure as explain in said U.S. Patent. The lower plate 7 is secured to the upper plate 3 by a set of pillars 8, which are screwed on one hand into the bars 5 and on the other hand into the mass of the lower plate 7. This plate may be laid on the platform. The upper plate 3 is fastened at its periphery to the platform 1 by a series of spacers 6.

Grooves 9 are provided in the lower plate 7 to partially lodge the spacers and further to define the relative position of this upper plate with respect to the spacers.

FIG. 2 depicts a section of a spacer 6 and a pillar 8. Each pillar 8 has two shoulders 15 and 16 determining the separation between the plates 3 and 7. The pillar is screwed into the bar 5 on one end and is fastened to the plate 7 by a nut 17 screwed onto its other threaded end. Each spacer 6 includes a base 10 fastened to the platform 1 by a weld 11 around its perimeter or by any other equivalent means.

The base 10 includes an hollow 12 and is shown in the figure in the general form of a hollow cylinder with an open base. A metal female stud 13a is fitted into the opening 12 and is sealed in it by a packing 14 of synthetic resin. This packing can be arranged as shown in the figure at the base of this stud, to provide a rigid mounting resisting both compressive and tensile loads. The plate 3 rests on the free end of this stud and is fastened to it by a screw 13b, screwed longitudinally into the female stud 13a.

To compensate for any surface irregularities in the platform 1, a film 18 of resin is laid between the platform and the lower plate 7, which also ensures as large as possible a contact area. Another film 19 of resin is laid around the perimeter of the lower plate 7 to limit any movements it may make and to prohibit any infiltration of liquid. The figure also shows an inclined ramp 20 to make vehicle handling easier.

FIG. 3 shows the pillar 8 fastened at the edges of plates 3 and 7 in the same way as described before.

Briefly speaking, the excess elevation of the device according to the invention is of the order of 10 cm above the platform and the device can receive loads exceeding 13 tons. It will be noted that the thickness of the lower plate may be small with respect to the thickness of the upper plate. This thickness is about 5 times lower than the thickness of said upper plate, for example lower than or equal to 1 cm. This thickness fluctuates comparatively to the stiffness of said platform. Tests were made with ordinary sheet-metal, 2 to 5 mm thickness, and it was noted that the device according the invention resists to the tracking of an heavy helicopter, for example of 13 tons. Thus, the entire structure contribute to the tensile strength.

Figure 4:
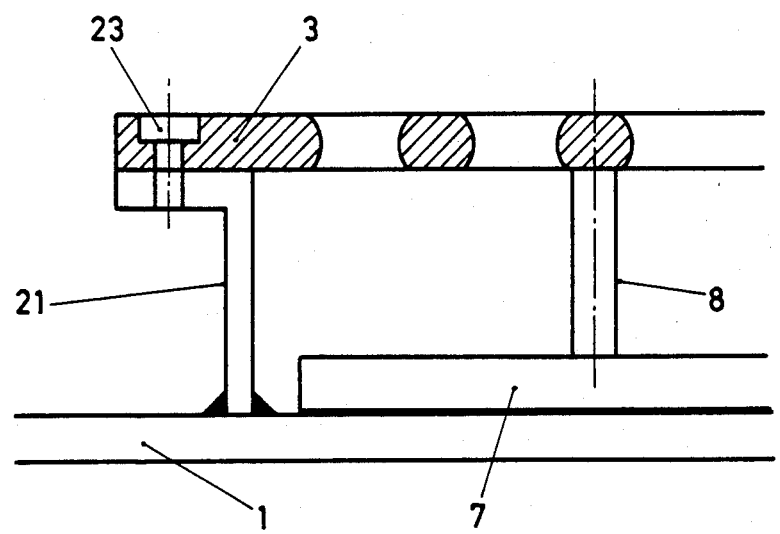
Figure 5:
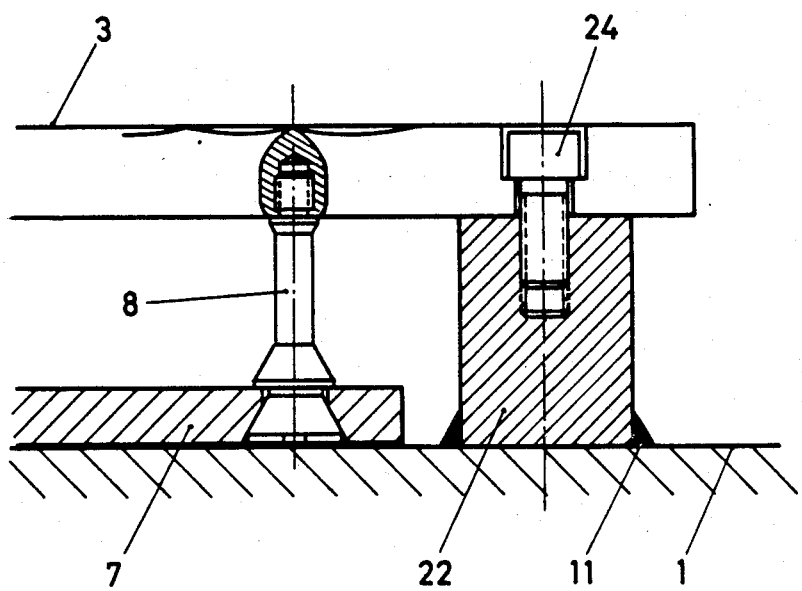

FIGS. 4 and 5 show a variant construction of the spacer. It is designed in the form of support legs, for example in the form of a cylinder 22 or L-shaped pieces 21, welded on one end in the platform. However, these legs can be brought together to make a single ring piece or annular sectors connecting the platform to the perforated plate as indicate above. Of course these legs are fastened to the perforated plate 3 by screws 23 and 24.

What we claimed is:

1. A reception and securing device for a hooking system used for mooring loads or vehicles onto a platform, of the type including one upper perforated plate and support means for said plate, connected together by pillars, wherein said support means comprise one lower plate of approximately constant thickness in contact with said platform, in combination with said pillars which comprise two shoulders respectively in contact with said upper and lower plates, to make a strong unit and to provide a constant separation between said upper perforated plate and said lower plate.

2. A device as in claim 1, wherein the thickness of said lower plate is thin comparatively to the thickness of said upper plate, for example lower than or equal to 1 cm.

3. A device as in claim 2, which comprises means for securing said upper plate to said platform, said means being one spacer.

4. A device according to claim 3, wherein said spacer consists of a set of legs welded to said platform, said upper plate being attached to each leg by a screw.

5. A device according to claim 3, wherein said spacer consists of a set of bases fastened to said platform, one female stud being secured in an opening in each base.

6. A device according to claim 5, wherein said perforated plate is connected to each female stud by one screw fitted longitudinally into said stud.

7. A device according to claim 6, wherein each female stud is sealed in each said base by a packing of synthetic resin.

8. A device according to claim 6, wherein each base is welded to said platform.

9. A device according to any claim 7, wherein each base is fitted into a groove of said lower plate.

10. A device according to claim 9, wherein a film of synthetic resin is laid between said lower plate and said platform on the one side, and between said lower plate and said spacer on the other side.

11. A reception and securing device for a hooking system used for mooring loads or vehicles onto a platform, of the type including one upper perforated plate and support means for said plate, connected together by pillars, wherein:
    said support means comprise one lower plate of approximately constant thickness in contact with said platform , in combination with said pillars which comprise two shoulders respectively in contact with said upper and lower plates, to make a strong unit and to provide a constant separation between said upper perforated plate and said lower plate;
    means for securing said upper plate to said platform, said means being one spacer consisting of a set of bases fastened to said platform, one female stud being secured in an opening in each base; and
    said perforated plate being connected to each female stud by one screw fitted longitudinally into said stud, each female stud being sealed in each said base by a packing of synthetic resin.

12. A device according to claim 11, wherein each base is welded to said platform.

13. A device according to claim 12, wherein each base is fitted into a groove of said lower plate.

14. A device according to claim 11, wherein a film of synthetic resin is laid between said lower plate and said platform, and between said lower plate and said spacer.

15. A device according to claim 11, wherein the thickness of said lower plate is thin compared to the thickness of said upper plate.

* * * * *